(No Model.)
C. E. HADLEY.
CRANK AXLE FOR BICYCLES.
No. 535,244. Patented Mar. 5, 1895.
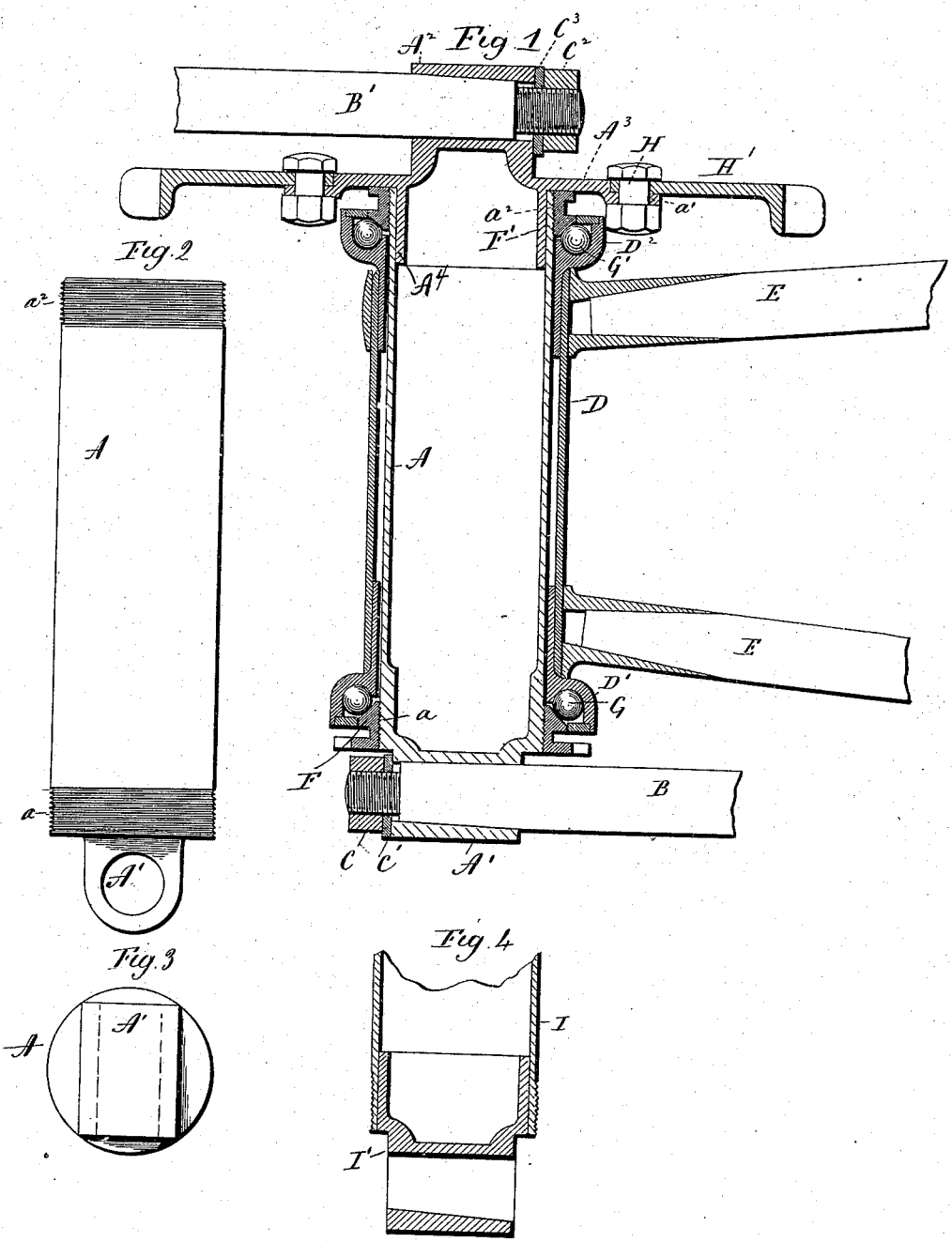

UNITED STATES PATENT OFFICE.

CHARLES E. HADLEY, OF CHICOPEE, ASSIGNOR TO THE OVERMAN WHEEL COMPANY, OF CHICOPEE FALLS, MASSACHUSETTS.

CRANK-AXLE FOR BICYCLES.

SPECIFICATION forming part of Letters Patent No. 535,244, dated March 5, 1895.

Application filed May 14, 1894. Serial No. 511,157. (No model.)

*To all whom it may concern:*

Be it known that I, CHARLES E. HADLEY, of Chicopee, in the county of Hampden and State of Massachusetts, have invented a new Improvement in Crank-Axles for Bicycles; and I do hereby declare the following, when taken in connection with the accompanying drawings and the letters of reference marked thereon, to be a full, clear, and exact description of the same, and which said drawings constitute part of this specification, and represent, in—

Figure 1, a view in horizontal central section of one form which my improvement may assume; Fig. 2, a detached view of the axle; Fig. 3, a view thereof in end elevation looking toward its socket; Fig. 4, a detached view of a modified form of the axle.

My invention relates to an improvement in crank-axles for bicycles, and particularly for bicycles of the safety type, the object being to produce a simple, light and strong construction, designed with particular reference to ease of assemblance and dismemberment.

With these ends in view, my invention consists in a crank-axle having certain details of construction and combinations of parts as will be hereinafter described and pointed out in the claims.

As shown in Figs. 1 and 2 of the drawings, the axle A, which is tubular, has a crank-arm socket A', located at a right angle to it, formed integral with one of its ends, the said socket being as small in every dimension as the exterior diameter of the axle. The bore of the socket is slightly tapering, and adapted to receive the tapering inner end of the crank-arm B, the extreme end of which is reduced in diameter, and threaded to receive a retaining-nut C, between which and the adjacent end of the socket, I by preference locate a washer C'.

For convenience of description I shall hereinafter speak of the end of the axle provided with the socket A', as its outer end, and the opposite end of the axle as its inner end.

By making the socket smaller in every dimension than the external diameter of the axle, I am enabled to slip the same, socket end first, through the horizontally arranged tubular box D, which forms the bearing for the axle, the said box being connected with the lower ends E E of the machine-frame in any approved manner, the details of which do not concern this invention, which is independent of the particular construction of the crank-bearing, or of its support by the machine-frame. The opposite ends of the said bearing are constructed with concavo-convex ball-bearing flanges D' and D², of ordinary construction. The said outer end of the axle is exteriorly threaded as at $a$, for the application of the adjustable ball-bearing cone F, which holds a series of balls G within the ball-bearing flange D' before mentioned.

It will be understood that the aperture of the cone is sufficiently large to adapt it to pass readily over the socket A' of the axle, so that after the axle has been introduced, socket end first, into the bearing, the said cone may then be readily applied to it, after which the crank-arm B is introduced into and secured to the socket. The opposite or inner end of the axle has permanently attached to it a combined part comprising a socket A², a sprocket-wheel hub A³ and an inwardly projecting sleeve A⁴, corresponding in diameter to the internal diameter of the open end of the axle, into which the said sleeve is brazed, or otherwise secured, prior to the passage of the outer end of the axle through the bearing D.

The hub A³ before mentioned, is provided with perforations $a'$, for the attachment by means of bolts H, of the removable sprocket-wheel crown H'. The bore of the socket A² corresponds to the bore of the socket A', and is adapted to receive the tapering inner end of the crank-arm B', the extreme inner end of which is reduced and threaded to receive a retaining nut C², between which and the adjacent end of the socket, I locate a washer C³.

The inner end of the axle is threaded, as at $a^2$ for the reception of an annular ball-bearing cone F', which holds a series of balls G' within the flange D² of the bearing D.

In the use of my invention, the integral part comprising the socket A², the sprocket-wheel hub A³ and the sleeve A⁴, will be permanently connected with the open end of the hollow axle A, after which the opposite end of the same will be slipped through the bearing D, together with its integral socket. The cone F is then screwed onto the outer end of the axle, and the crank-arm B connected with the socket A'. The balls are then put in place, and the adjustment of the axle is complete. If it is desired to remove the axle, it is only necessary to remove the crank arm B and the cone F, after which the axle may be readily drawn out of the bearing. It will thus be seen that under my improved construction, the insertion and removal of the crank-axle are very readily effected. This is a matter of great convenience, both to the manufacturer and to the user of the machine. Furthermore, my improved axle is very light, stiff and strong, and has but few parts.

Preferably I make one of the sockets integral with the axle, as shown in Figs. 1, 2 and 3, but I may, if desired, form both sockets independent of the axle, and apply them thereto. Thus, in Fig. 4 of the drawings, the tubular axle I is provided at its outer end with an independently formed socket I', which is brazed into or otherwise firmly secured to the outer end of the axle, and is no larger in any dimension than the external diameter thereof. I would, therefore, have it understood that I do not limit myself to the exact construction herein shown and described, but hold myself at liberty to make such changes and alterations as fairly fall within the spirit and scope of my invention.

I may say in conclusion that the device herein shown and described has some features in common with, and may in a sense be considered an improvement upon, the device shown and described in United States Patent No. 495,732, granted to me under date of April 18, 1893.

Having fully described my invention, what I claim as new, and desire to secure by Letters Patent, is—

1. In a bicycle, the combination with a crank-axle bearing constructed at its ends with ball flanges, of a tubular crank-axle provided at its outer end with a crank-arm socket located at a right angle to it, and not exceeding in any diameter the external diameter of the axle, whereby the socket is adapted to pass through the said bearing, a crank-arm socket and sprocket-wheel hub secured to the open inner end of the said tubular crank-axle, crank-arms having their inner ends adapted to be inserted into the said sockets with which they are removably connected, and ball-bearing cones located at the ends of the axle in position to co-operate with the said ball flanges, that at the outer end of the axle being removable, substantially as described.

2. In a bicycle, the combination with a crank-axle bearing, constructed at its ends with ball flanges, of a tubular crank-axle provided at its outer end with a tubular crank-arm socket located at a right angle to it, having a tapering opening to receive the inner end of a crank-arm and not exceeding in any dimension the external diameter of the axle, whereby the socket is adapted to pass through the said bearing, a combined crank-arm socket, sprocket-wheel hub and sleeve, made in one piece and secured by means of its sleeve to the open inner end of the axle, crank-arms having tapering inner ends removably connected with the said sockets, and ball-bearing cones connected with the ends of the axle, that at the outer end of the axle being removable, substantially as described.

In testimony whereof I have signed this specification in the presence of two subscribing witnesses.

CHARLES E. HADLEY.

Witnesses:
EDWD. W. CLEMENT,
CHARLES E. W. WOODWARD.